(12) United States Patent
Sluijs

(10) Patent No.: US 6,191,567 B1
(45) Date of Patent: Feb. 20, 2001

(54) DC-DC CONVERTER, WITH DUTY CYCLE COMPARISON FOR A DUAL MODE BACK BOOST CONVERTER

(75) Inventor: Ferdinand Jacob Sluijs, Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/563,302

(22) Filed: May 2, 2000

(30) Foreign Application Priority Data

May 4, 1999 (EP) .................................. 99201403

(51) Int. Cl.[7] .............................. G05F 1/24; G05F 1/26; G05F 1/44
(52) U.S. Cl. ......................... 323/259; 323/283; 323/263
(58) Field of Search .................................. 323/271, 282, 323/283, 222, 259, 263

(56) References Cited

U.S. PATENT DOCUMENTS

| | | | |
|---|---|---|---|
| 5,359,280 | 10/1994 | Canter et al. | 323/282 |
| 5,402,060 | 3/1995 | Erisman | 323/259 |
| 5,475,296 | 12/1995 | Vinsant et al. . | |
| 5,477,132 | * 12/1995 | Canter et al. | 323/282 |
| 5,576,940 | * 11/1996 | Steigerwald et al. | 363/17 |
| 5,602,464 | * 2/1997 | Linkowsky et al. | 323/272 |
| 5,831,418 | 11/1998 | Kitagawa | 323/222 |
| 5,949,224 | * 9/1999 | Barkaro | 323/282 |

* cited by examiner

Primary Examiner—Peter S. Wong
Assistant Examiner—Bao Q. Vu
(74) Attorney, Agent, or Firm—Steven R. Biren

(57) ABSTRACT

A converter for converting an input voltage ($U_i$) into an output voltage ($U_0$). The converter has several modes of operation. The converter can, for example, operate in an up-conversion mode, a down-conversion mode, or a window conversion mode. The converter has at least one switch ($S_1$–$S_4$) for controlling the converter so as to obtain a desired value of the output voltage ($U_0$) in the up-conversion mode and in the down-conversion mode. This is achieved by changing the duty cycle of a binary signal (BS) which controls the switch ($S_1$–$S_4$). The converter further includes means (DMNS) for detecting the duty cycle of the binary signal (BS). This duty cycle is compared with a reference duty cycle (RFDCCL). The result of this comparison is used for deciding whether or not to change over from the up-conversion mode (or the down-conversion mode) to the window conversion mode. In the window conversion mode each switch ($S_1$–$S_4$) in the converter is permanently closed or open. In the window conversion mode the output voltage ($U_0$) is roughly equal to the input voltage ($U_i$). The converter remains in the window conversion mode as long as the output voltage ($U_0$) is within a given voltage window (range). However, if the output voltage ($U_0$) has become too low, the converter changes over from the window conversion mode to the up-conversion mode. In a similar way, the converter changes over from the window conversion mode to the down-conversion mode when the output voltage ($U_0$) has become too high.

9 Claims, 2 Drawing Sheets

DC-DC CONVERTER, WITH DUTY CYCLE COMPARISON FOR A DUAL MODE BACK BOOST CONVERTER

BACKGROUND OF THE INVENTION

The invention relates to a converter for converting an input voltage into an output voltage, having a switch for controlling the converter under control of a binary signal by means of adaptation of the duty cycle of the binary signal so as to obtain a desired value of the output voltage, which converter has at least two conversion modes and which converter in its operation condition is in one of at least two conversion modes, and selection means for the selection of at least one of the at least two conversion modes.

Such a converter is known from United States Patent Specification 5,475,296. Said Specification describes a switched-mode voltage converter which operates in a so-called buck mode or in a so-called boost mode. The known converter further has means for comparing the output voltage with the input voltage. The result of said comparison is used for determining whether the converter is to be switched from the buck mode to the boost mode or vice versa. If the input voltage is higher than the output voltage the converter is in the buck mode. If the input voltage is lower than the output voltage the converter is in the boost mode.

A drawback of the known converter is that the method of determining when the converter should change from the buck mode too the boost mode or vice versa is comparatively complex.

SUMMARY OF THE INVENTION

It is an object of the invention to provide a converter which does not have this drawback.

To this end, according to the invention, the converter of the type defined in the opening paragraph is characterized in that the selection means include detection means for the detection of the duty cycle of the binary signal, and comparison means for comparing the duty cycle of the binary signal with a reference duty cycle and for supplying a mode control signal in response to the comparison in order to change over from one of the at least two conversion modes to another one of the at least two conversion modes.

As a result of this, in contradistinction to the known converter, no means are required for comparing the output voltage with the input voltage for the purpose of changing over from the one conversion mode to the other conversion mode.

The invention is based on the recognition of the fact that the duty cycle of the binary signal inherently contains information that can be used to indicate, by means of the mode control signal, when the converter should change over from the one conversion mode to another conversion mode. Let it be assumed, for example, that the converter has two conversion modes: an up-conversion mode, i.e. the converter functions as a so-called up-converter, and a down-conversion mode, i.e. the converter functions as a so-called down-converter. Let it further be assumed that the input voltage is 10 V, that the output voltage is 3 V, and that the desired output voltage is 12 V. (This situation can arise, for example, in that in a prior situation the input voltage was 10 V and the desired output voltage was 3 V, so that eventually the converter was permanently in the down-conversion mode in order to achieve the conversion from 10 V to 3 V, and subsequently the desired output voltage was changed to 12 V). It is then further likely (because the output voltage is much lower than the input voltage) that in spite of the fact that, in principle, it is also possible to realize a down-conversion by means of conventional up-converters, the converter will be dimensioned in such a manner that it is the down-conversion mode because the conversion is then more efficient. The duty cycle of the binary signal will adapt itself in order to end up at the desired output voltage of 12 V. When it is assumed that, in order to increase the output voltage of the converter (in the down-conversion mode) the duty cycle should be increased, the duty cycle of the binary signal will continually increase as long as the output voltage is lower than the desired output voltage. In the down-conversion mode the output voltage can never become greater than the input voltage. In the present example the output voltage can therefore not become higher than 10 V as long as the converter is in the down-conversion mode. In order to allow the desired output voltage to be reached in the end, the converter should duly change over from the down-conversion mode to the up-conversion mode. However, for reasons of efficiency the converter should preferably change over to the up-conversion mode when the output voltage is relatively close to 10 V, for example 9.7 V. It is important to recognize that the duty cycle (which, by definition, is always in the range from 0 to 1) of the binary signal is correlated with the output voltage. By comparison of the duty cycle of the binary signal with the reference duty cycle, it is therefore possible to determine when the converter should change over to the up-conversion mode. In the present example, as a result of said correlation, the reference duty cycle should have nearly its maximum value (for example 0.98) because an output voltage of 9.7 V lies comparatively close to the (theoretically) maximum attainable output voltage of 10 V. After the converter has changed over to the up-conversion mode the converter can raise the output voltage to the desired value of 12 V by adaptation of the duty cycle of the binary signal.

It is to be noted that the above example merely serves to clarify the invention and should not be interpreted as prerequisite for the implementation of the invention. Thus, the change-over from the one conversion mode to another conversion mode may, for example, be based on a reference duty cycle which is comparatively close to zero. It is also possible to use more than one binary signal, for example a binary signal for controlling the converter in the down-conversion mode and a further binary signal for controlling the converter in the up-conversion mode. It is also possible to use a plurality of reference duty cycles, for example in such a manner that each conversion mode has its own reference duty cycle. Furthermore, it is possible to have, for example, two up-conversion modes. Moreover, it is to be noted that in the known converter the change-over from an up-conversion mode to a down-conversion mode or vice versa is always effected at the instant that the output voltage equals the input voltage. This is in contradistinction to the converter in accordance with the invention, where the change-over point may be chosen freely.

An embodiment of a converter in accordance with the invention is further characterized in that the conversion modes include a first, a second and a third conversion mode, and in the operating condition the converter can change over from the first or from the third conversion mode to the second conversion mode under control of the mode control signal. To elucidate this, it is assumed by way of example that the first and third conversion mode is an up-conversion mode and a down-conversion mode, respectively, and that the second conversion mode is a so-called window conversion mode. The change-over from the up-conversion mode to the window conversion mode or from the down-conversion mode to the window conversion mode operates in a manner similar (i.e. by comparison of a duty cycle with a reference duty cycle) to that described in the previous example in which the converter changes over from a down-conversion mode to an up-conversion mode or vice versa. In the window conversion mode each of the switches in the converter is either permanently closed or permanently open. An advantage of this is that there are no switching losses and, as a result of this, the efficiency of the converter is higher. As long as the output voltage is within a so-called voltage window the converter remains in the window conversion mode. The voltage window defines a lower limit and an upper limit within which the output voltage may be situated.

Since in the window conversion mode each switch is either permanently closed or permanently open the change-over to the down-conversion mode or to the up-conversion mode cannot be effected by means of the detection of the duty cycle of the binary signal and the comparison of this duty cycle with a reference duty cycle. This is because the duty cycle of the binary signal is permanently equal to zero or permanently equal to one in the window conversion mode.

In order to yet enable a change-over from the window conversion mode to another conversion mode a further embodiment of a converter in accordance with the invention is further characterized in that the converter includes evaluation means for the evaluation of the output voltage in order to supply a further mode control signal in response to the last-mentioned evaluation for this purpose of changing over from the first conversion mode to either the first or the third conversion mode.

By way of example it is again assumed that the first conversion mode is an up-conversion mode, that the third conversion mode is a down-conversion mode, and that the second conversion mode is a window conversion mode. Depending on whether the output voltage is lower than the lower limit or higher than the upper limit, or higher than the lower limit but lower than the upper limit, the evaluation means indicate by means of the further mode control signal whether the converter should change over to the up-conversion mode, or to the down-conversion mode, or the converter should remain in the window conversion mode.

Owing to the voltage window, it will usually not be necessary to impose stringent accuracy requirements on the comparators. As a result of this, comparatively small and cheap (and, possibly, easy to design) comparators can be used. A first comparator compares the output voltage of the converter with a first reference voltage, which defines the lower limit of the voltage window. A second comparator compares the output voltage of the converter with a second reference voltage, which defines the upper limit of the voltage window. If the converter is in the window conversion mode and at a given instant the output voltage becomes lower than the lower limit of the voltage window, the first comparator will supply a signal which causes the converter to switch over to the up-conversion mode. If the converter is in the conversion mode and at a given instant the output voltage becomes higher than the upper limit of the voltage window, the second comparator will supply a signal which causes the converter to switch over to the down-conversion mode.

As an alternative, which yields a slightly less accurate result, it is also possible to make a comparison between the input voltage and the first or the second reference voltage by means of the first and the second comparator, respectively.

The converter in accordance with the invention can be used particularly advantageously if the input voltage is within the voltage window or if, in the case that the input voltage is outside the voltage window, it is comparatively close to the lower limit or the upper limit of the voltage window. As a result, it is very advantageous to use the converter in accordance with the invention particularly in the case of battery-powered apparatuses. Let it be assumed, for example, that a battery-powered apparatus operates correctly when it is powered with a voltage of minimum 4.0 V and maximum 4.5 V. This means that the converter can be dimensioned in such a manner that the lower limit and the upper limit of the voltage window is 4.0 V and 4.5 V, respectively. Let it further be assumed that the voltage source for supplying the input voltage of the converter is a so-called 4.5 V type battery. It is not unlikely that, when the battery is still relatively full and the power consumption of the apparatus is low, it possibly supplies a voltage of 4.7 V. The converter will then be in the down-conversion mode. If after some time (the amount of time depends on the current consumption of the apparatus) the battery is less full and, consequently, the output voltage of the converter has decreased to 4.5 V, the converter switches over from the down-conversion mode to the window conversion mode. As the battery is further drained the input voltage will gradually decrease further, as a result of which the output voltage of the converter also decreases further. At the instant at which the output voltage has decreased to 4.0 V (and the battery has already been drained to a considerable extent) the converter changes over from the window conversion mode to the up-conversion mode in order to prevent the output voltage from decreasing even further. The output voltage will only drop below 4.0 V when the battery is substantially empty and, as a consequence, the input voltage is too low, for example 1 V.

Generally, it takes a comparatively long time before the output voltage has decreased from 4.5 V to 4.0 V as a result of the battery being drained. This means that the converter is in the window conversion mode for the greater part of the life span of the battery. As a result of this the efficiency of the converter is very high.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
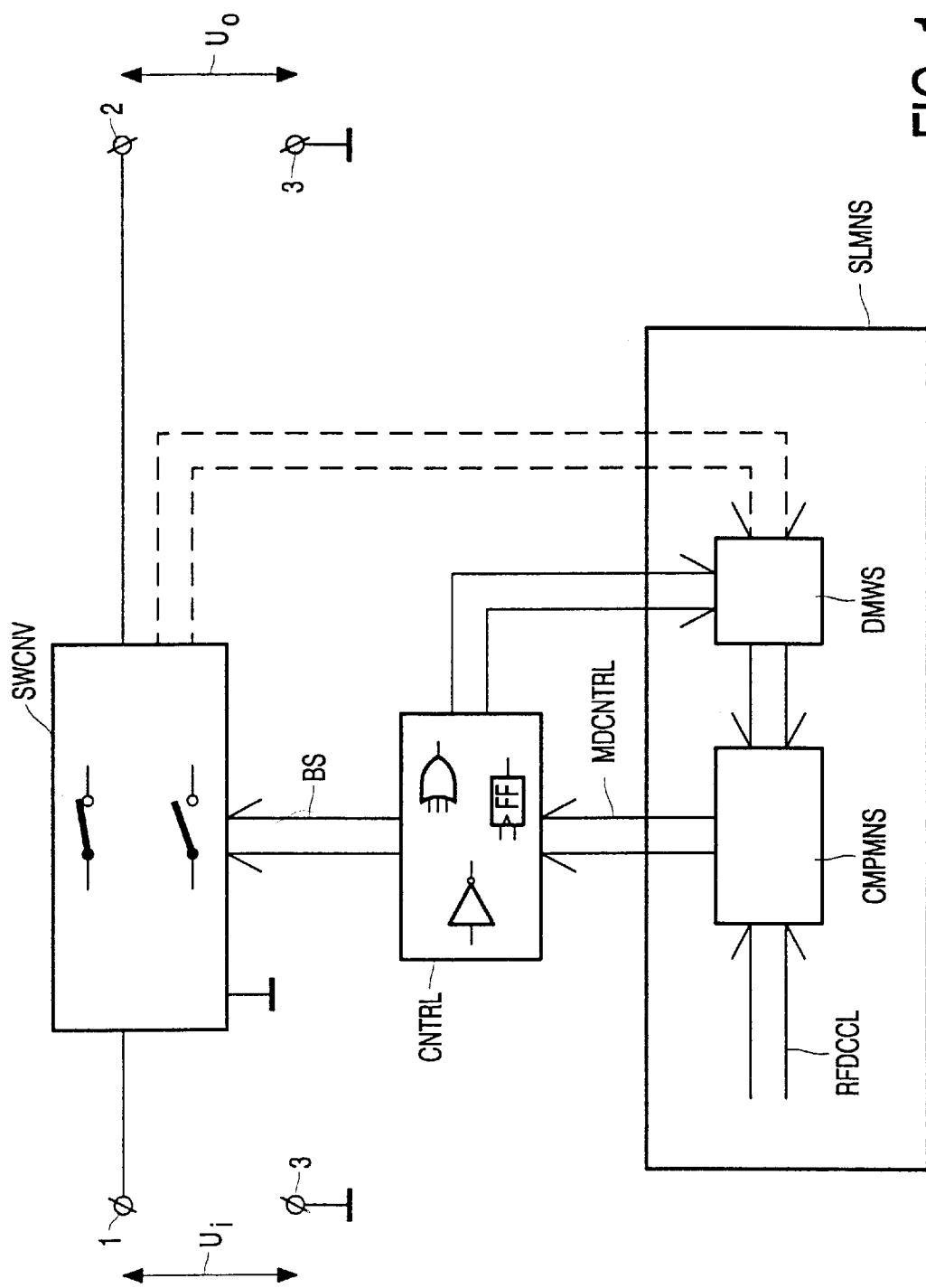
FIG. 1 shows an electrical circuit diagram of an embodiment of a converter in accordance with the invention.

FIG. 1 shows an electrical circuit diagram of an embodiment of a converter in accordance with the invention. The converter comprises a switched-mode converter SWCNV which converts an input voltage $U_i$ between an input terminal 1 and a ground terminal 3 into an output voltage $U_o$, which is available between an output terminal 2 and the ground terminal 3. The switches of the switched-mode converter SWCNV are controlled by means of one or more binary signals BS supplied by a digital controller CNTRL. The switched-mode converter SWCNV can operate in various conversion modes, for example in an up-conversion mode or in a down-conversion mode. In which mode the switched-mode converter SWCNV operates is dependent on the binary signal BS. The information required by the digital controller CNTRL in order to supply the correct binary signal BS is obtained from selection means SLMNS, which supply said information by means of a mode control signal MDCNTRL. For supplying the mode control signal MDCNTRL the selection means SLMNS include detection means DMNS and comparison means CMPMNS. The detection means DMNS detect the duty cycle of the binary signal BS. The comparison means CMPMNS compare the duty cycle of the binary signal BS with a reference duty cycle RFDCCL. In response to this comparison the comparison means supply the mode control signal MDCNTRL. The detection means DMNS can determine the duty cycle of a switch of the converter SWCNV by a direct measurement of the duty cycle of the relevant switch, as is shown by means of the broken lines, or by an indirect measurement of the duty cycle of the relevant switch by deriving the duty cycle from the digital controller CNTRL, as is shown by the continuous lines. The reference duty cycle RFDCCL may be supplied, for example, from an external source, thus enabling it to be changed in a simple manner, when necessary. It is then possible, for example by means of a computer, to program an arbitrary duty cycle. However, the reference duty cycle RFDCCL may also be stored in internal hardware of the converter.

Figure 2:
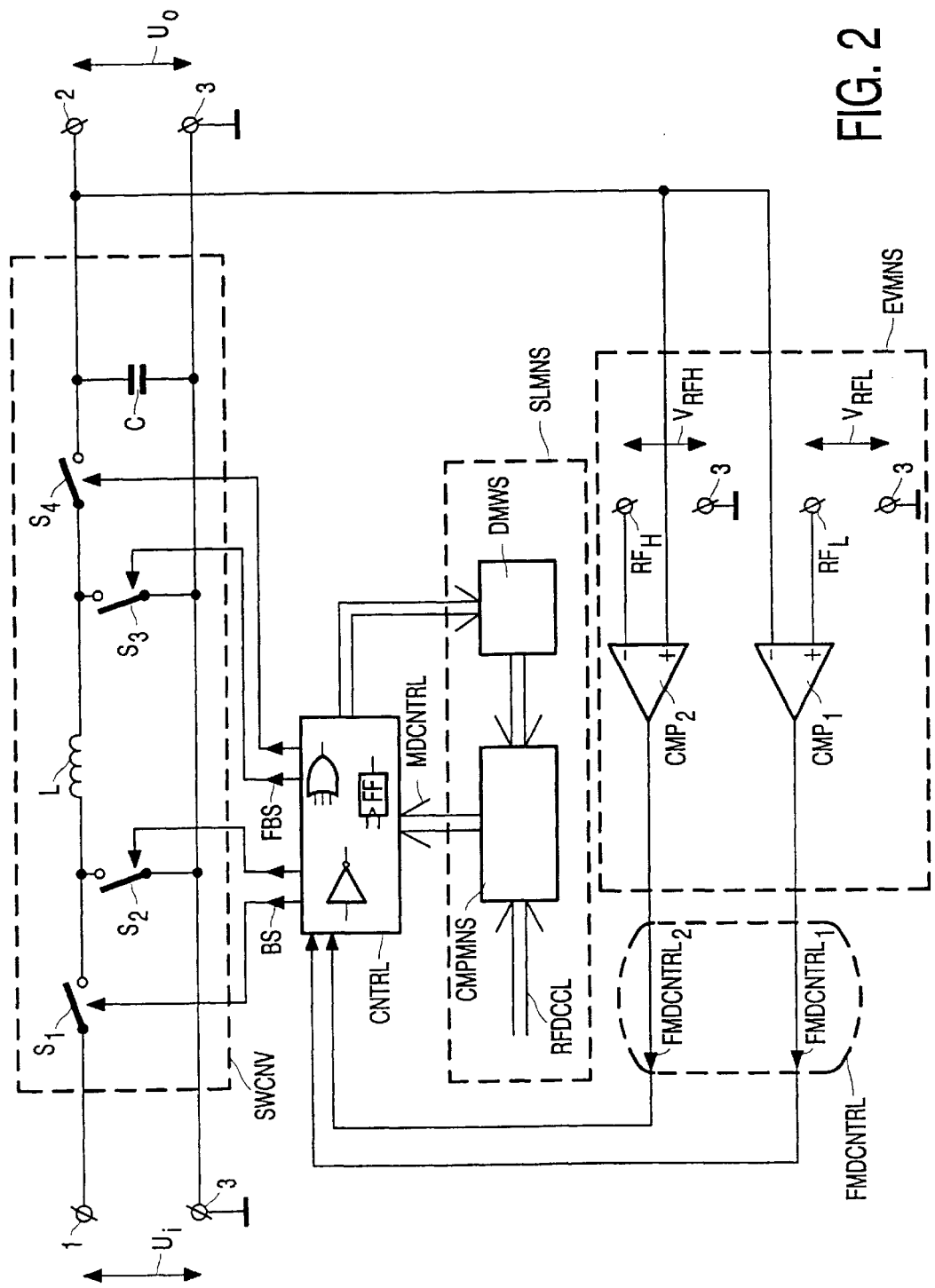
FIG. 2 shows an electrical circuit diagram of a further embodiment of a converter in accordance with the invention.

FIG. 2 shows an electrical circuit diagram of a further embodiment of a converter in accordance with the invention. The switched-mode converter SWCNV includes first to fourth switches $S_1$–$S_4$, a coil L and a capacitor C, which serves for smoothing the output voltage $U_0$. The first switch $S_1$, the coil L, and the fourth switch $S_4$ are arranged in series with one another between the input terminal 1 and the output terminal 2, the coil being interposed between the first switch $S_1$ and the fourth switch $S_4$. A second switch $S_2$ has one side connected to a node common to the first switch $S_1$ and the coil L, and has its other side connected to the ground terminal 3. A third switch $S_3$ has one side connected to a node common to the fourth switch $S_4$ and the coil and has its other side connected to the ground terminal 3.

In addition to the up-conversion mode and the down-conversion mode the converter also has a window conversion mode. For this purpose, the converter has been provided with evaluation means EVMNS for evaluating the output voltage $U_0$ in order to supply a further mode control signal FMDCNTRL in response to the evaluation. The further mode control signal FMDCNTRL indicates whether or not the converter should change over from the window conversion mode to either the down-conversion mode or the up-conversion mode. The evaluation means EVMNS in the present example include a first comparator $CMP_1$ and a second comparator $CMP_2$. The first comparator $CMP_1$ has a first input connected to a first reference terminal $RF_L$, has a second input connected to the output terminal 2, and has an output coupled to the digital controller CNTRL. The second comparator $CMP_2$ has a first input connected to a second reference terminal $RF_H$, has a second input connected to the output terminal 2, and has an output coupled to the digital controller CNTRL. The first and the second comparator $CMP_1$, $CMP_2$ respectively supply a first and a second further mode control signal $FMDCNTRL_1$, $FMDCNTRL_2$.

If the converter is in the window conversion mode and the output voltage $U_0$ is within a voltage window the converter remains in the window conversion mode. A lower limit of the voltage window is defined by a first reference voltage $V_{RFL}$ between the first input of the comparator $CMP_1$ and the ground terminal 3. An upper limit of the voltage window is defined by a second reference voltage $V_{RFH}$ between the first input of the comparator $CMP_2$ and the ground termninal 3.

When it is assumed, for example, that the first input of the first comparator $CMP_1$ is the plus input and the second input is the minus input, and that first input of the second comparator $CMP_2$ is the minus input and the second input is the plus input, both the first and the second further mode control signal $FMDCNTRL_1$, $FMDCNTRL_2$ have a logic low level if the converter is in the window conversion mode. If the output voltage $U_0$ becomes smaller than the first reference voltage VRFL the first further mode control signal $FMDCNTRL_1$ goes to a logic high to indicate that the converter should change over to the up-conversion mode. Likewise, the second further mode control signal $FMDCNTRL_1$ goes to a logic high to indicate that the converter should change over to the down-conversion mode.

The switches $S_1$–$S_4$ may be formed by various types of switches, such as for example bipolar transistors, field effect transistors, thyristors, or relays. It is also possible to use other types of switched-mode converters SWCNV, for example switched-mode converters which do not include a coil but which include only switches and capacitive elements.

The converter may be formed by means of discrete components or it may be incorporated in an integrated circuit.

What is claimed is:

1. A converter for converting an input voltage ($U_i$) into an output voltage ($U_0$), having a switch ($S_1$–$S_4$) for controlling the converter under control of a binary signal (BS) by means of adaptation of the duty cycle of the binary signal (BS) so as to obtain a desired value of the output voltage ($U_0$), which converter has at least two conversion modes and which converter in its operation condition is in one of at the least two conversion modes, and selection means (SLMNS) for the selection of one of the at least two conversion modes, characterized in that the selection means (SLMNS) include detection means (DMNS) for the detection of the duty cycle of the binary signal (BS), and comparison means (CMPMNS) for comparing the duty cycle of the binary signal (BS) with a reference duty cycle (RFDCCL) and for supplying a mode control signal (MDCNTRL) in response to the comparison in order to change over from one of the at least two conversion modes to another one of the at least two conversion modes.

2. A converter as claimed in claim 1, characterized in that the conversion modes include a first, a second and a third conversion mode, and in the operating condition the converter can change over from the first or from the third conversion mode to the second conversion mode under control of the mode control signal (MDCNTRL).

3. A converter as claimed in claim 2, characterized in that the converter includes evaluation means (EVMNS) for the evaluation of the output voltage ($U_0$) in order to supply a further mode control signal (FMDCNTRL) in response to the last-mentioned evaluation for this purpose of changing over from the first conversion mode to either the first or the third conversion mode.

4. A converter as claimed in claim 3, characterized in that the first conversion mode is an up-conversion mode, the third conversion mode is a down-conversion mode, and the second conversion mode is a window conversion mode, in which window conversion mode the output voltage ($U_0$) is within a voltage window defined by a voltage window lower limit and a voltage window upper limit, and in which window conversion mode each switch ($S_1$–$S_4$) of the converter is either permanently closed or permanently open.

5. A converter as claimed in claim 4, characterized in that the further mode control signal (FMDCNTRL) comprises: a first further mode control signal ($FMDCNTRL_1$) for the change-over from the window conversion mode to the up-conversion mode if the output voltage ($U_O$) is lower than the lower limit of the voltage window, and a second further mode control signal ($FMDCNTRL_2$) for the change-over from the window conversion mode to the down-conversion mode if the output voltage ($U_O$) is higher than the upper limit of the voltage window.

6. A converter as claimed in claim 5, characterized in that the evaluation means (EVMNS) for the evaluation of the output voltage ($U_O$) comprise: a first comparator ($CMP_1$) for the comparison of the output voltage ($U_O$) with a first reference voltage ($VRF_1$) which corresponds to the lower limit of the voltage window, and for the supply of the first firther mode control signal ($FMDCNTRL_1$) in response to the last-mentioned comparison; and a second comparator ($CMP_2$) for the comparison of the output voltage ($U_O$) with a second reference voltage ($VRF_2$) which corresponds to the upper limit of the voltage window, and for the supply of the second further mode control signal ($FMDCNTRL_2$) in response to the last-mentioned comparison.

7. A converter as claimed in claim 1, characterized in that the reference duty cycle is in the range from 0–0.1.

8. A converter as claimed in claim 1, characterized in that the reference duty cycle is in the range from 0.9–1.

9. A converter as claimed in claim 1, characterized in that the converter comprises: an input terminal (1) and a ground terminal (3) for receiving the input voltage ($U_i$) between the input terminal (1) and the ground terminal (3); an output terminal (2) for supplying the output voltage ($U_O$) between the output terminal (2) and the ground terminal (3); a first ($S_1$), a second ($S_2$), a third ($S_3$), and a fourth ($S_4$) switch, the switch ($S_1$–$S_4$) for controlling the converter under control of the binary signal (BS) being one of the first ($S_1$), second ($S_2$), third ($S_3$), or fourth ($S_4$) switches; and a coil (L); and in that the first switch ($S_1$) has a first terminal coupled to the input terminal (1) and the first switch ($S_1$) has a second terminal coupled to a first terminal of the second switch ($S_2$), and the second switch ($S_2$) has a second terminal coupled to the ground terminal (3), and the coil (L) has a first terminal coupled to the second terminal of the first switch ($S_1$) and the coil (L) has a second terminal coupled to a first terminal of the third switch ($S_3$), and the third switch has a second terminal coupled to the ground terminal (3), and the fourth switch ($S_4$) has a first terminal coupled to the second terminal of the coil (L), and the fourth switch ($S_4$) has a second terminal coupled to the output terminal (2); and in that in the operating condition and in the up-conversion mode the first switch (S) is permanently closed, the second switch ($S_2$) is permanently open, the third switch ($S_3$) is alternately opened and closed, and the fourth switch ($S_4$) is alternately opened and closed in phase opposition with respect to the third switch ($S_3$); and in that in the operating condition and in the down-conversion mode the third switch ($S_3$) is permanently open, the fourth switch ($S_4$) is permanently closed, the first switch ($S_1$) is alternately opened and closed, and the second switch ($S_2$) is alternately opened and closed in phase opposition with respect to the first switch ($S_1$), and in that in the operating condition and in the window conversion mode the first switch ($S_1$) and the fourth switch ($S_4$) are permanently closed, and the second switch ($S_2$) and the third switch ($S_3$) are permanently open.

* * * * *